US012600276B2

(12) United States Patent
Park

(10) Patent No.: US 12,600,276 B2
(45) Date of Patent: Apr. 14, 2026

(54) INDEPENDENT AIR CONDITIONING SEAT FOR VEHICLES

(71) Applicant: SEOYON E-HWA CO., LTD., Anyang (KR)

(72) Inventor: Hyun Jun Park, Seoul (KR)

(73) Assignee: SEOYON E-HWA CO., LTD., Anyang (KR)

( * ) Notice: Subject to any disclaimer, the term of this patent is extended or adjusted under 35 U.S.C. 154(b) by 424 days.

(21) Appl. No.: 18/486,987

(22) Filed: Oct. 13, 2023

(65) Prior Publication Data

US 2024/0123882 A1     Apr. 18, 2024

(30) Foreign Application Priority Data

Oct. 17, 2022     (KR) ........................ 10-2022-0133008

(51) Int. Cl.
B60N 2/56          (2006.01)

(52) U.S. Cl.
CPC .................................. B60N 2/5657 (2013.01)

(58) Field of Classification Search
CPC .. B60N 2/5657; B60N 2/5635; B60N 2/5621; B60N 2/5628
See application file for complete search history.

(56) References Cited

U.S. PATENT DOCUMENTS 7,320,223 B1     1/2008  Dabney
9,975,394 B2 *   5/2018  Fitzpatrick ........... B60N 2/5671

| | | | |
|---|---|---|---|
| 10,232,748 B2 * | 3/2019 | Akaike ................. | B60N 2/565 |
| 11,904,658 B2 * | 2/2024 | Enke ...................... | B60H 1/245 |
| 12,269,383 B2 * | 4/2025 | Son ....................... | B60N 2/5635 |
| 12,280,631 B2 * | 4/2025 | Makita ................... | B60N 2/565 |
| 2015/0329026 A1 * | 11/2015 | Hall ...................... | B60N 2/5657 |
| | | | 297/180.1 |
| 2016/0250956 A1 * | 9/2016 | Seiting ................. | B60N 2/5671 |
| | | | 297/180.14 |
| 2016/0325655 A1 * | 11/2016 | Joshi .................... | B60N 2/5657 |
| 2016/0347218 A1 * | 12/2016 | Akaike ................ | B60N 2/5657 |
| 2019/0142172 A1 * | 5/2019 | Toda ................... | B60N 2/5607 |
| | | | 297/180.13 |
| 2019/0152362 A1 * | 5/2019 | Kondo .................. | B60N 2/565 |
| 2019/0283636 A1 * | 9/2019 | Imaizumi ............. | B60N 2/6009 |
| 2020/0390641 A1 * | 12/2020 | Arthurs ................. | B60N 2/976 |

(Continued)

FOREIGN PATENT DOCUMENTS

| | | |
|---|---|---|
| DE | 112014004856 T5 | 7/2016 |
| DE | 112016001567 T5 | 12/2017 |

(Continued)

OTHER PUBLICATIONS

The office action issued by the German PTO on Jul. 7, 2025.

*Primary Examiner* — Shin H Kim
(74) *Attorney, Agent, or Firm* — Harvest IP Law, LLP

(57)          ABSTRACT

Disclosed herein is an independent air-conditioning seat for vehicles, wherein a plurality of discharge members are installed on a circumference of a seat body and the upper surface of the exit of the discharge member hole of each discharge member is formed as a curved surface connected to the side wall of the seating space of the seat body. Therefore, due to the Coanda effect, the air discharged from the discharge member flows closer to the seat body, thereby reducing an independent air-conditioning space in size.

12 Claims, 8 Drawing Sheets

(56)                    References Cited

U.S. PATENT DOCUMENTS

| | | | |
|---|---|---|---|
| 2021/0001687 A1* | 1/2021 | Enke | B60H 1/243 |
| 2023/0302871 A1* | 9/2023 | Makita | B60N 2/5657 |
| 2024/0123882 A1* | 4/2024 | Park | B60N 2/5657 |

FOREIGN PATENT DOCUMENTS

| | | | |
|---|---|---|---|
| DE | 112017007059 T5 | 10/2019 |
| JP | 2015083407 A | 4/2015 |
| JP | 2016216001 A | 12/2016 |
| JP | 2018043727 A | 3/2018 |
| JP | 2018131005 A | 8/2018 |
| JP | 2019162928 A | 9/2019 |

* cited by examiner

[FIG.1]
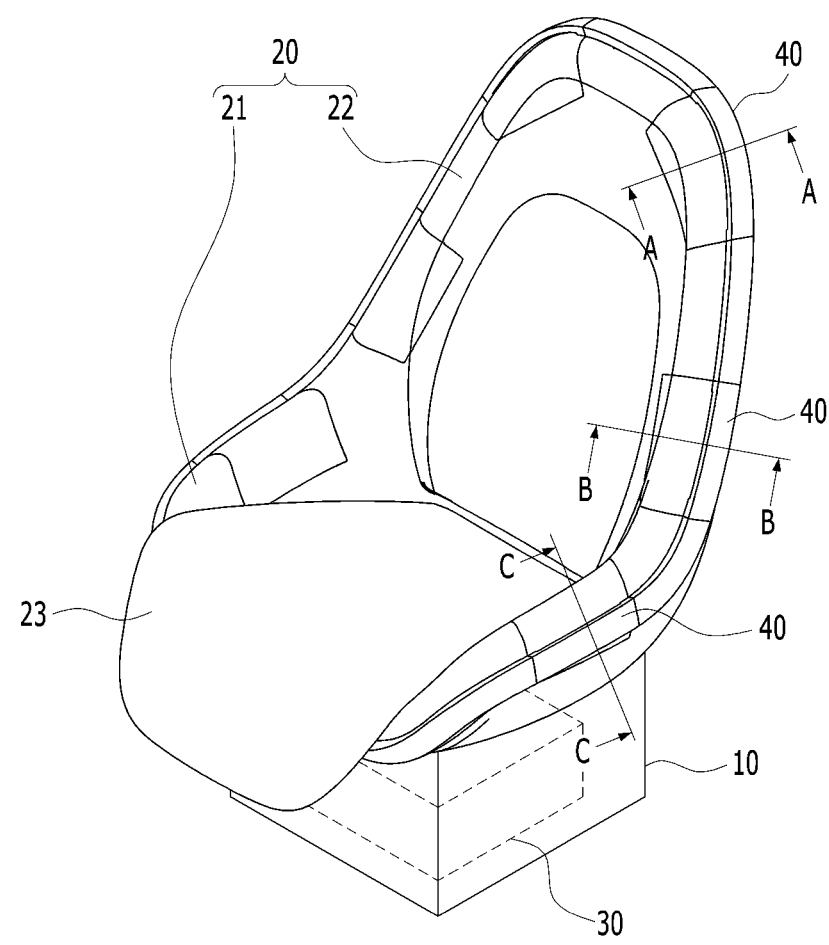

[FIG.2]
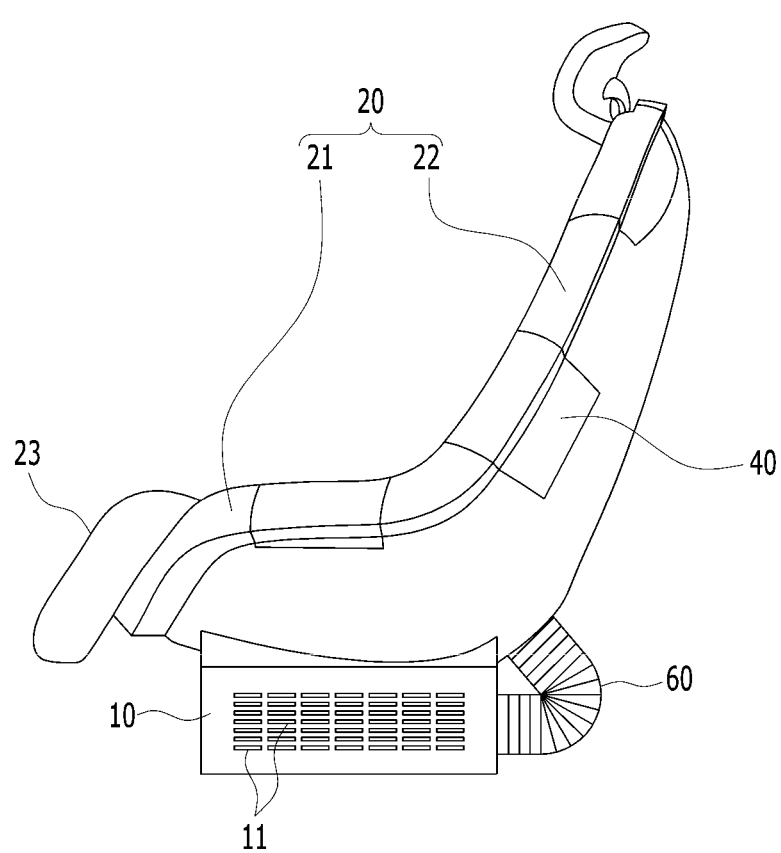

[FIG.3]
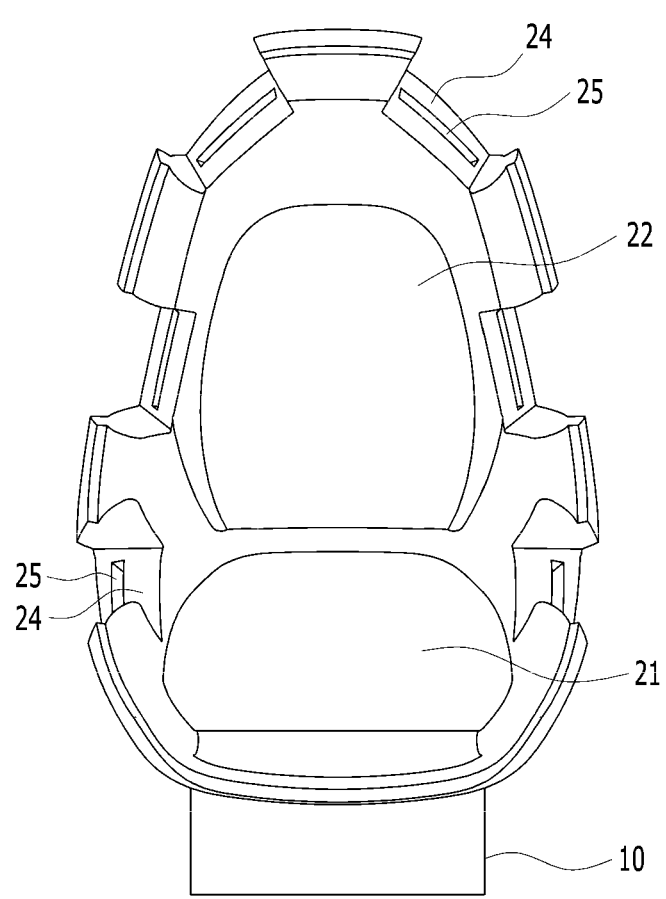

[FIG.4]
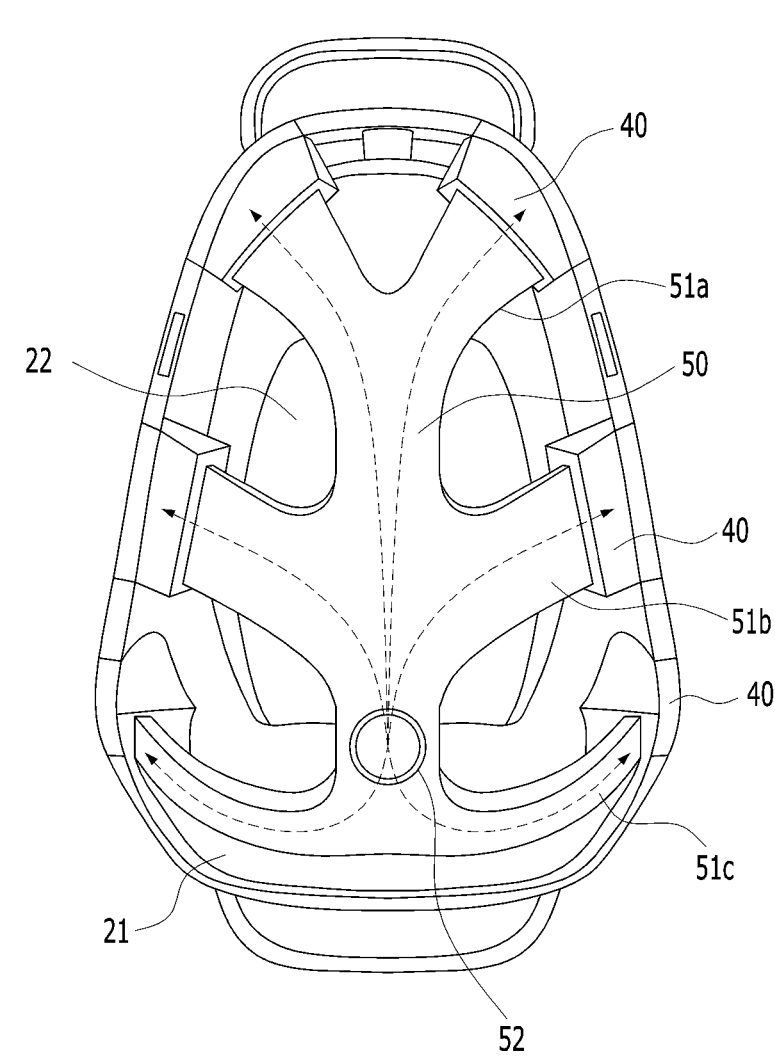

[FIG.5]
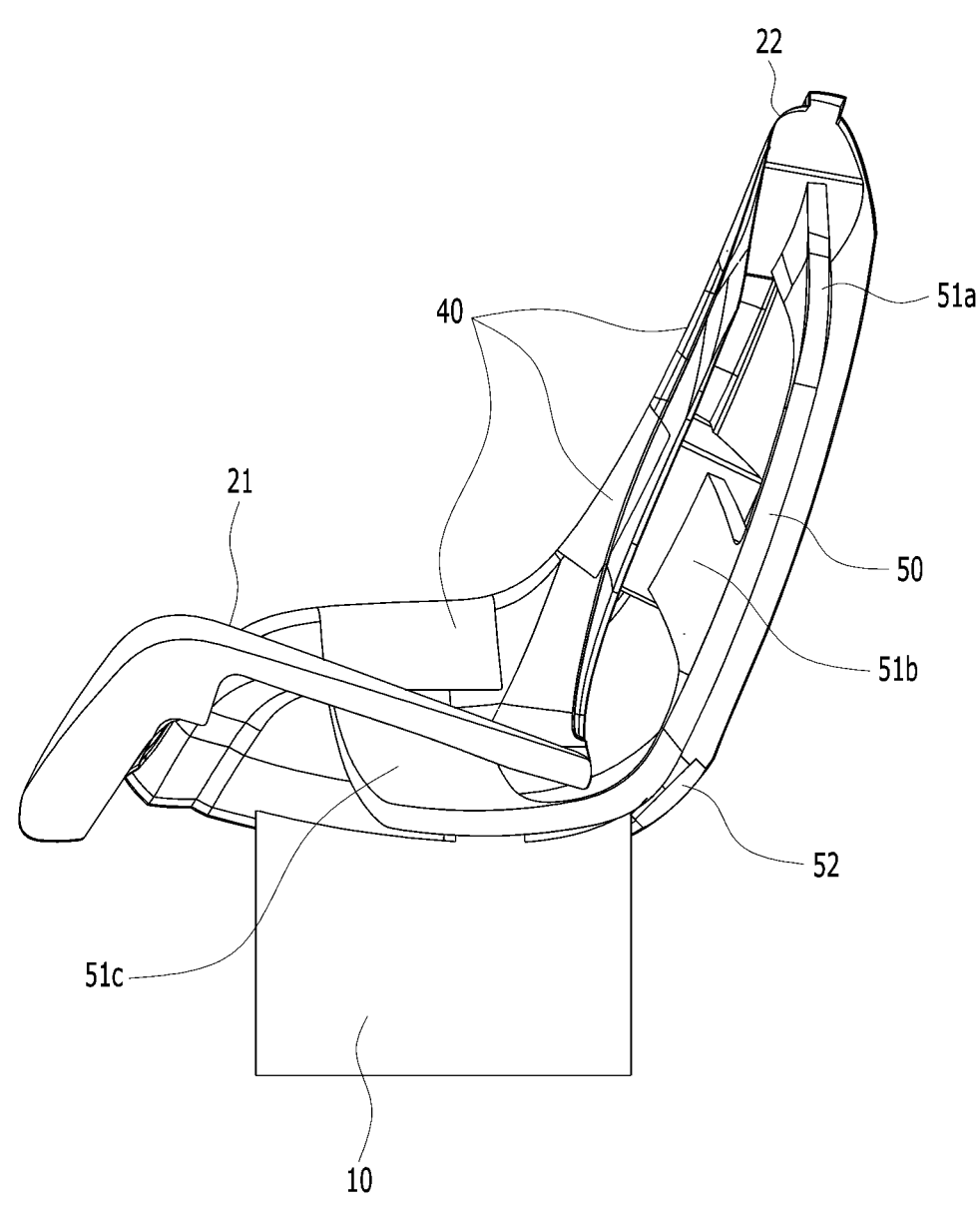

[FIG.6(a)]
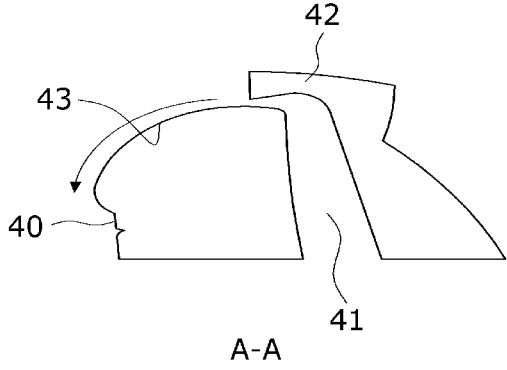
A-A
[FIG.6(b)]
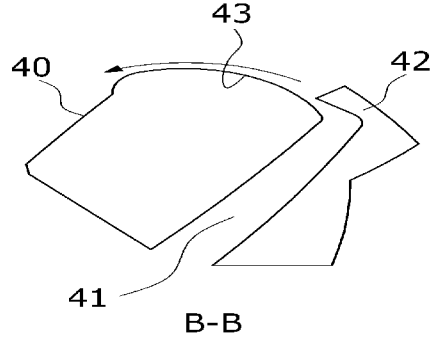
B-B
[FIG.6(c)]
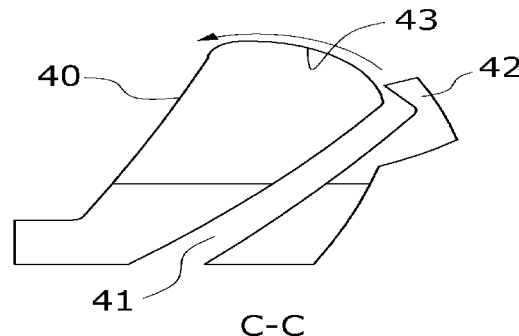
C-C

[FIG.7(a)]
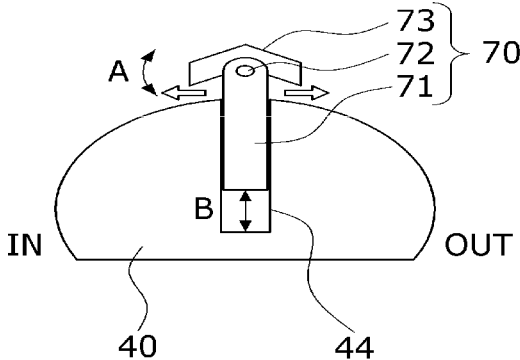
[FIG.7(b)]
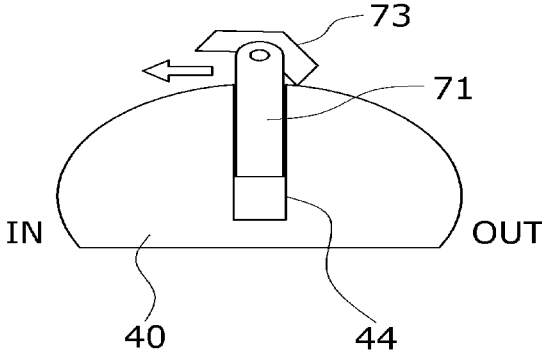
[FIG.7(c)]
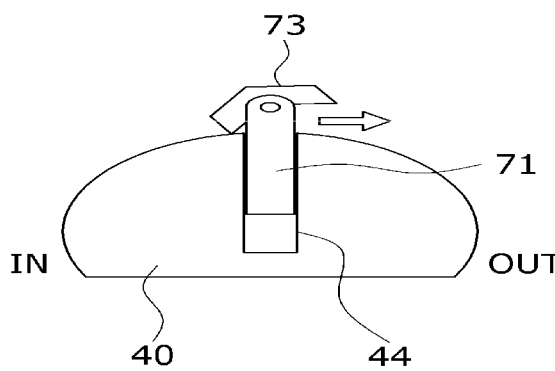

[FIG.8]
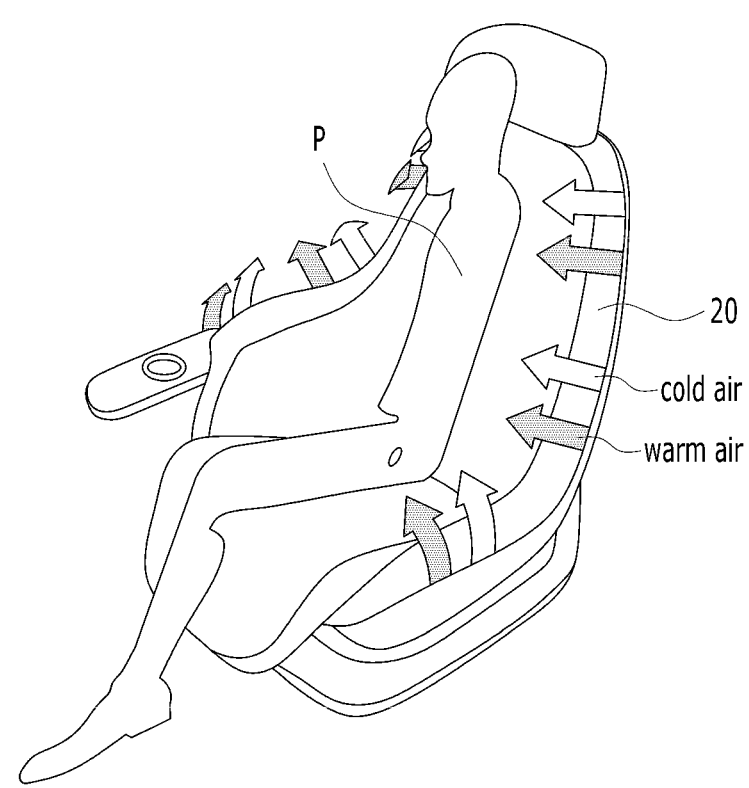

INDEPENDENT AIR CONDITIONING SEAT FOR VEHICLES

BACKGROUND

1. Technical Field

The present disclosure relates to an independent air-conditioning seat for vehicles, and more particularly, to an independent air-conditioning seat for vehicles, which is capable of providing an independent air-conditioning atmosphere for each individual occupant.

2. Related Art

The prevalence of electric vehicles is gradually increasing, and consumers view a mileage at full charge as a major factor in their purchase decision of electric vehicles. Therefore, many efforts are being made to increase a mileage by reducing vehicle weight and increasing battery performance.

An electric vehicle uses battery power as a source of cooling and heating energy therefor since it does not have an engine. For this reason, the electric vehicle may have a low mileage when operating its heating and cooling system.

Meanwhile, in order to provide an independent air-conditioning atmosphere (condition or state) to each individual occupant as part of convenience of passengers, an air-conditioning system for vehicles as disclosed in the following patent document (Japanese Patent Application Publication No. 2018-043727) has been developed.

However, the conventional air-conditioning system for vehicles as described in the above patent document may deteriorate the usability (livability) and openness of a vehicle interior space since a lot of the interior space is occupied by a fence member (with ducts installed therein) installed to surround a seat.

In addition, the conventional air-conditioning system for vehicles may not meet expectations for energy saving effects as an independent air-conditioning seat since it greatly increases an independent air-conditioning space in size surrounded by air-conditioned wind discharged from the inside of the fence member. Furthermore, the conventional air-conditioning system for vehicles may have little effect on extending a mileage by reducing battery power consumption even when it is applied to an electric vehicle.

The foregoing is intended for technical information possessed for derivation of the present disclosure or acquired in the process of derivation thereof by the inventor, which is not necessarily a known technique disclosed to the general public prior to the filing of the invention.

Patent Document (Patent Document 1) Japanese Patent Application Publication No. 2018-043727 (Mar. 22, 2018)

SUMMARY

Various embodiments are directed to an independent air-conditioning seat for vehicles, which is capable of eliminating a need for separate additional structure surrounding a seat for defining an independent air-conditioning space, thereby preventing a reduction in vehicle interior space due to the additional structure.

Also, various embodiments are directed to an independent air-conditioning seat for vehicles, which is capable of minimizing an independent air-conditioning space in size to reduce heating and cooling power consumption, thereby increasing a mileage of an electric vehicle.

The present disclosure is not limited to the above-mentioned objects, and other objects of the present disclosure will be clearly understood by those skilled in the art to which the present disclosure pertains from the following description.

In accordance with an aspect of the present disclosure, there is provided an independent air-conditioning seat for vehicles, which includes a lower casing installed on an interior floor of a vehicle, a seat body installed on an upper surface of the lower casing, an air-conditioning device installed inside the lower casing, a plurality of discharge members installed on a circumference of the seat body and each having a discharge member hole formed through upper and lower surfaces thereof, wherein an upper surface of an exit of the discharge member hole is formed as a curved surface connected to a side wall of a seating space of the seat body, thereby creating a Coanda effect, due to which air discharged from the discharge member hole flows close to the seat body, and a flow path provided inside the seat body and connecting the air-conditioning device and the discharge members.

The seat body may include a seat cushion configured to support an occupant's lower body and a seat back configured to support an occupant's upper body, which are formed integrally with each other.

The flow path may be an empty space integrally defined inside the seat body.

In the independent air-conditioning seat for vehicles according to the present disclosure, the flow path may have an inlet formed on one side of the rear thereof, and the inlet of the flow path may be connected to an outlet of the air-conditioning device by a deformable connection pipe.

The discharge members may be installed on both sides of the top of the seat back, both sides of the middle of the seat back, and both sides of the seat cushion.

The discharge members may be inserted and installed into discharge member installation grooves formed on the circumference of the seat body.

The discharge members may form the circumference of the seat body together with parts between the discharge member installation grooves, and form a continuous surface without steps with the parts between the discharge member installation grooves.

In the independent air-conditioning seat for vehicles according to the present disclosure, the discharge member installation grooves may be formed with passage holes communicating with the flow path, and when the discharge members are installed in the discharge member installation grooves, the passage holes of the discharge member installation grooves may be connected to the discharge member holes of the discharge members, respectively.

In the independent air-conditioning seat for vehicles according to the present disclosure, each of the discharge members may have a guide formed on one side of the upper surface thereof to cover an upper portion of the discharge member hole, the guide being configured to guide a discharge direction of air so that the air having passed through the discharge member hole is discharged toward the inside of the seat body.

In the independent air-conditioning seat for vehicles according to the present disclosure, each of the discharge members may be equipped with an adjustment guide to adjust a degree of opening of the discharge member hole and a discharge direction of air.

The adjustment guide may include a pair of elevating rods inserted into insertion holes formed on both sides of the discharge member hole of the discharge member and maintained at its vertical position by friction force with inner surfaces of the insertion holes, and a guide member connected rotatably at both ends thereof via a hinge pin to each of the pair of elevating rods.

The guide member may have a high central part where the hinge pin is installed, and have an inner end facing the inside of the seat body and an outer end facing the outside of the seat body, which are bent downward compared to the central part.

As is apparent from the above description, the independent air-conditioning seat for vehicles according to the present disclosure can eliminate the need for separate additional structure to define the independent air-conditioning space since the independent air-conditioning space is defined by the air-conditioned wind discharged from the seat itself, thereby improving the usability (livability) and openness of the vehicle interior space.

In addition, the independent air-conditioning seat for vehicles according to the present disclosure minimizes the size of the independent air-conditioning space by forming the air curtain surrounding the adjacent part of the occupant's body due to the Coanda effect of the curved surface formed adjacent to the exit of the discharge member hole of the seat. Thus, it is possible to minimize the reduction in battery power consumed for indoor cooling and heating of the vehicle and to increase the mileage of the electric vehicle.

Furthermore, the independent air-conditioning seat for vehicles according to the present disclosure minimizes the size of the independent air-conditioning space as described above, thereby enabling the user to feel comfort (thermal comfort) more quickly after operating the air-conditioning device.

The present disclosure is not limited to the above-mentioned effects, and other effects of the present disclosure will be clearly understood by those skilled in the art to which the present disclosure pertains from the following description.

BRIEF DESCRIPTION OF THE DRAWINGS

FIG. 1 is a perspective view illustrating an independent air-conditioning seat for vehicles according to an embodiment of the present disclosure.

FIG. 2 is a side view of the independent air-conditioning seat for vehicles in FIG. 1.

FIG. 3 is a front perspective view illustrating the independent air-conditioning seat for vehicles in FIG. 1 with discharge members removed therefrom.

FIG. 4 is a rear view illustrating the independent air-conditioning seat for vehicles in FIG. 1 with a lower casing and a connection pipe removed therefrom, together with an internal structure thereof.

FIG. 5 is a longitudinal cross-sectional view of the independent air-conditioning seat for vehicles in FIG. 1.

FIG. 6 is a cross-sectional view of one discharge member, where FIG. 6(a) is a cross-sectional view taken along line A-A of FIG. 1, FIG. 6(b) is a cross-sectional view taken along line B-B of FIG. 1, and FIG. 6(c) is a cross-sectional view taken along line C-C of FIG. 1.

FIG. 7(a), FIG. 7(b), and FIG. 7(c) are side views illustrating different states of installation and use of an adjustment guide installed on each discharge member.

FIG. 8 is a perspective view schematically illustrating a state of operation of the independent air-conditioning seat for vehicles according to the embodiment of the present disclosure.

DETAILED DESCRIPTION

The accompanying drawings in the present disclosure may have been exaggerated for differentiation and clarity from the prior art and for the sake of understanding the technology. In addition, the terms used in the specification are terms defined in consideration of functions of the present disclosure, and these terms may change depending on the intention or practice of a user or an operator. Therefore, these terms should be defined based on the overall disclosures set forth herein. Meanwhile, the following embodiments are merely for the purpose of describing the components set forth in the appended claims and are not intended to limit the spirit and scope of the disclosure.

Throughout the specification, it will be understood that, when a component is referred to as "comprising" or "including" any component, it does not exclude other components, but can further comprise or include the other components unless otherwise specified.

In addition, it will be understood that, when a component is referred to as being "connected", "joined", or "coupled" to another component, it can be "directly connected", "directly joined", or "directly coupled" to the other component or it can be "indirectly connected", "indirectly joined", or "indirectly coupled" to the other component with other components being interposed therebetween. On the other hand, it will be understood that, when a component is referred to as being "directly connected", "directly joined", or "directly coupled" to another component, no intervening components are present.

In addition, when directional terms such as "before", "after", "up", "down", "left", "right", "one end", "other end", and "both ends" are used, these terms should not be construed as limiting as they are used by way of example in relation to the orientation in the drawings disclosed herein. As used herein, the terms such as "first" and "second" should not be construed as limiting terms for distinguishing each component.

In order to more clearly describe features of embodiments of the present disclosure, a detailed description of matters widely known to those skilled in the art to which the following embodiments pertain will be omitted. In addition, a detailed description of parts irrelevant to the embodiment and description in the drawings will be omitted.

Hereinafter, exemplary embodiments of the present disclosure will be described in detail with reference to the accompanying drawings.

FIG. 1 is a perspective view illustrating an independent air-conditioning seat for vehicles according to an embodiment of the present disclosure. FIG. 2 is a side view of the independent air-conditioning seat for vehicles in FIG. 1. FIG. 3 is a front perspective view illustrating the independent air-conditioning seat for vehicles in FIG. 1 with discharge members removed therefrom. FIG. 4 is a rear view illustrating the independent air-conditioning seat for vehicles in FIG. 1 with a lower casing and a connection pipe removed therefrom, together with an internal structure thereof. FIG. 5 is a longitudinal cross-sectional view of the independent air-conditioning seat for vehicles in FIG. 1. FIG. 6 is a cross-sectional view of one discharge member, where (a) is a cross-sectional view taken along line A-A of FIG. 1, (b) is a cross-sectional view taken along line B-B of FIG. 1, and (c) is a cross-sectional view taken along line C-C of FIG. 1. FIGS. 7(a), 7(b), and 7(c) are side views illustrating different states of installation and use of an adjustment guide installed on each discharge member. FIG. 8 is a perspective view schematically illustrating a state of operation of the independent air-conditioning seat for vehicles according to the embodiment of the present disclosure.

Referring to FIGS. 1 to 8, the independent air-conditioning seat for vehicles according to the embodiment of the present disclosure includes a lower casing 10, a seat body 20, an air-conditioning device 30, discharge members 40, and a flow path 50.

The lower casing 10 is in the form of a substantially rectangular box and is installed on the interior floor of a vehicle. The lower casing 10 may be installed fixedly on the interior floor or movably along a rail installed on the floor. The air-conditioning device is installed inside the lower casing 10.

The lower casing 10 has a plurality of inlet holes 11 formed on one side thereof to introduce indoor air into the lower casing 10 therethrough so that the air-conditioning device 30 may suck the indoor air in the vehicle.

The seat body 20 includes a seat cushion 21 that supports an occupant's lower body (hips and thighs) and a seat back 22 that supports an occupant's upper body (back), which are formed integrally with each other. The seat cushion 21 is installed on the upper surface of the lower casing 10.

The seat cushion 21 may be installed fixedly on the upper surface of the lower casing 10 or movably along a rail installed on the upper surface of the lower casing 10.

Reference numeral 23 refers to a cushion member, which is illustrated in FIGS. 1 and 2 as being installed only on the seat cushion 21, but of course may also be installed on the seat back 22 if necessary.

The flow path 50 is formed inside the seat body 20. The flow path 50 is not formed by providing a separate tubular structure, but is an empty space in the form of a passage defined inside the seat body 20.

In addition, as illustrated in FIG. 3, the seat body 20 has discharge member installation grooves 24 formed on the circumference thereof for installation of the discharge members 40, and the discharge member installation grooves 24 are formed in the same number as the discharge members 40. The discharge member installation grooves 24 are one each on both sides of the top and one each on both sides of the middle of the seat back 22, and one each on both sides of the middle of the seat cushion 21. That is, the discharge member installation grooves 24 may be formed at a total of six locations on the circumference of the seat body 20.

Each of the discharge member installation grooves 24 is formed with a passage hole 25 to which the flow path 50 is connected. That is, the flow path 50 communicates with a space outside the seat body 20 through the passage hole 25.

The air-conditioning device 30 is installed inside the lower casing 10 and serves to supply cold air, warm air, and/or room temperature air (room temperature wind) to the flow path 50. The air-conditioning device 30 may use a heat pump cooling and heating device that utilizes the phase change of refrigerant. In addition, a convection-type planar heating element may be used as a heat source for heating. The air-conditioning device 30 may include a blower (not shown) to blow cooling air, heating air, and room temperature air into the flow path 50.

The air-conditioning device 30 has an outlet connected to an inlet 52 (see FIG. 4) of the flow path 50 by means of a connection pipe 60 (see FIG. 2). The connection pipe 60 may be a corrugated pipe or a hose to enable the seat body 20 to move relative to the lower casing 10 movement when the seat body 20 is installed in a movable structure to the lower casing 10.

The discharge members 40 are inserted and installed into the discharge member installation grooves 24, and form the circumference of the seat body 20 together with parts between the discharge member installation grooves 24 during installation. During installation, the outer surfaces of the discharge members 40 have the same shape as the rest of the circumference of the seat body 20 where the discharge member installation grooves 24 are not formed. Accordingly, the seat body 20 has a continuous circumferential surface as a whole, and is designed to have no step (difference in height) due to the separate discharge members 40. That is, the discharge members 40 are inserted and installed into the discharge member installation grooves 24 formed on the circumference of the seat body 20, and form the circumference of the seat body 20 together with the parts between the discharge member installation grooves 24. In addition, the discharge members 40 are preferably configured to form a continuous surface without steps with the parts between the discharge member installation grooves 24.

The discharge members 40 are installed on both sides of the top of the seat back 22, on both sides of the middle of the seat back 22, and on both sides of the seat cushion 21, respectively.

The discharge members 40 are connected to the flow path 50 through the passage holes 25 during installation. Each of the discharge members 40 has a discharge member hole 41 (see FIG. 6) formed through the lower and upper surfaces thereof. During the installation of the discharge members 40, each passage hole 25 of the seat body 20 is connected to an associated one of the discharge member holes 41 of the discharge members 40.

The flow path 50 is a passage that receives wind blown from the air-conditioning device 30 through the connection pipe 60 and delivers the wind to the discharge members 40. To this end, the flow path 50 includes an upper branch passage 51a connected to the discharge members on both sides of the top of the seat back 22, an intermediate branch passage 51b connected to the discharge members 40 on both sides of the middle of the seat back 22, and a lower branch passage 51c connected to the discharge members 40 on both sides of the seat cushion 21.

As illustrated in FIG. 4, the inlet 52 is formed in the lower portion of the rear of the flow path 50 (which is approximately the connection between the seat cushion 21 and the seat back 22). The inlet 52 is connected to the outlet (not shown) of the air-conditioning device 30 via the connection pipe 60.

As illustrated in FIGS. 6(a), 6(b), and 6(c), each of the discharge members 40 may have a guide 42 formed to guide the discharge direction of air.

The guide 42 is formed integrally on one side of the discharge member hole 41 of the discharge member 40 to guide the discharge direction of air toward the inside of the seat body 20 (place where an occupant is sitting). To this end, the guide 42 covers the upper portion of the exit of the discharge member hole 41 so that the exit of the discharge member hole 41 is directed toward the inside of the seat body 20.

Accordingly, the discharge direction of the air from the discharge member hole 41 is guided by the guide 42 to discharge the air into the seat body 20.

In this case, the upper surface 43 of the discharge member 40 in the discharge direction of air is formed as a curved surface that is smoothly connected to a side wall of a seating space inside the seat body 20. In addition, the upper surface 43 of the discharge member 40 is formed as a curved surface whose curvature gradually increases as moving away from the exit of the discharge member hole 41.

Thus, the air discharged from the discharge member 41 is supplied to the body of the occupant sitting on the seat body 20 while flowing along the upper surface 43 of the discharge member 40 by the Coanda effect (a phenomenon in which fluid flows along an adjacent curved surface due to viscosity). That is, due to the Coanda effect caused by the upper surface 43 of the discharge member 40, the air discharged from the discharge member hole 41 does not spread outward but flows as close to the seat body 20 as possible, thereby forming an air curtain close to the seat body 20. Therefore, the space inside the air curtain, namely, the independent air-conditioning space, can be minimized in size.

Meanwhile, as illustrated in FIG. 7, an adjustment guide 70 may be installed on the discharge member 40 instead of the guide 42. The adjustment guide 70 includes a pair of elevating rods 71 inserted into insertion holes 44 formed on both sides of the discharge member hole 41, respectively, and a guide member 73 connected rotatably at both ends thereof via a hinge pin 72 (in the direction of arrow A) to each of the pair of elevating rods 71 (FIG. 7 is a side view of the adjustment guide 70).

Each of the elevating rods 71 may be maintained at a position in the vertical direction (direction of arrow B) adjusted by a user by the friction force generated between the elevating rod 71 and the inner surface of the associated insertion hole 44.

The guide member 73 has a width and length that may cover the upper portion of the discharge member hole 41 (the exit of the discharge member hole 41 is open upward since there is no guide 42). When viewed from the side as illustrated in the drawings, the guide member 73 has an inner end and an outer end bent downward at the same angle with respect to the center thereof where the hinge pin 72 is installed. That is, the guide member 73 has a high central part where the hinge pin 72 is installed, and has an inner end facing the inside of the seat body 20 and an outer end facing the outside of the seat body 20, which are bent downward compared to the central part.

Thus, the user may adjust the vertical height of the guide member 73 by pulling the guide member 73 upward or pressing it downward.

As illustrated in FIG. 7(*a*), air may be discharged to both the inside and outside of the seat body 20 when the guide member 73 is horizontal. The air discharged to the inside of the seat body 20 is supplied to the occupants, and the air discharged to the outside is used to create an air-conditioning atmosphere in a space other than the independent air-conditioning space of the seat, namely, the remaining interior space.

As the guide member 73 moves away from the exit of the discharge member hole 41, the volume of discharged air is increased by an increase in the degree of opening of the exit of the discharge member hole 41. On the contrary, as the guide member 73 moves close to the discharge member hole 41, the volume of discharged air is decreased. When the guide member 73 is completely lowered so that both front and rear ends thereof touch the surface of the discharge member 40, the discharge member hole 41 is blocked and air is not discharged.

In addition, as illustrated in FIG. 7(*b*), when the guide member 73 is rotated at an appropriate height in the direction in which the outer end is lowered and the outer end touches the surface of the discharge member 40, the air is guided by the inner end of the guide member 73 and discharged toward the inside of the seat body 20.

On the contrary, as illustrated in FIG. 7(*c*), when the guide member 73 is rotated in the direction in which the inner end is lowered and the inner end touches the surface of the discharge member 40, the air is guided by the outer end of the guide member 73 and is discharged toward the outside of the seat body 20.

As described above, the volume and direction of the air discharged from the discharge member 40 may be adjusted as desired by adjusting the adjustment guide 70. Therefore, the convenience of the independent air-conditioning seat can be further improved because the user sets the volume and direction of air as desired.

With the above configuration, the cold air, warm air, and/or room temperature air generated by the air-conditioning device 30 may flow along the connection pipe 60 and the flow path 50 to be discharged through the discharge member 40. That is, as illustrated in FIG. 8, wind is discharged from the left and right and upper/middle/lower portions on the circumference of the seat body 20 and is supplied to the occupants. The wind discharged from the discharge members 40 on both sides of the top of the seat back 22 is supplied to the head, neck, and shoulders of the occupant. The wind discharged from the discharge members 40 on both sides of the middle of the seat back 22 is supplied to the arms and upper body of the occupant. The wind discharged from the discharge members on both sides of the seat cushion 21 is supplied to the legs of the occupant.

The wind discharged from each of the discharge members 40 gradually spreads in the discharge direction, thereby forming an air curtain that surrounds the entire body of the occupant sitting on the seat body 20.

In this case, since the upper surface 43 of the discharge member 40 is formed as a curved surface connected to the inside of the seat body 20, namely, the side wall of the seating space, the wind flows close to the seat body 20 due to the Coanda effect so that the air curtain is formed as close to the seat body 20 as possible. Accordingly, the size of the independent air-conditioning space formed in each sheet is minimized, thereby reducing the amount of energy required to achieve the same cooling, heating, and blowing performance.

Therefore, when the independent air-conditioning seat according to the present disclosure is applied to an electric vehicle, the battery power consumed for air conditioning can be reduced, thereby increasing the mileage of the vehicle.

In addition, as the size of the independent air-conditioning space is minimized as described above, the desired air-conditioning atmosphere may be achieved in a faster time when the air-conditioning device is operated. Therefore, the occupants can feel comfortable more quickly.

Furthermore, since the independent air-conditioning seat according to the present disclosure forms an air curtain by the air discharged from the seat itself, there is no need to install a separate structure to form the independent air-conditioning space. Thus the usability (livability) and openness of the vehicle interior space are improved by preventing the vehicle interior space from being occupied by the separate structure.

As described above, the independent air-conditioning seat for vehicles according to the present disclosure can increase the usability and openness of the vehicle interior space, increase the mileage when applied to an electric vehicle, and improve the thermal comfort felt by the occupants.

The present disclosure relates to an independent air-conditioning seat for vehicles, which can be used in industrial applications related to vehicle seats and air conditioning.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims. Therefore, the true technical protection scope of the present disclosure should be defined by technical concepts of the appended claims.

What is claimed is:

1. An independent air-conditioning seat for vehicles, comprising:

a lower casing installed on an interior floor of a vehicle;

a seat body installed on an upper surface of the lower casing;

an air-conditioning device installed inside the lower casing;

a plurality of discharge members installed on a circumference of the seat body and each having a discharge member hole formed through upper and lower surfaces thereof, wherein an upper surface of an exit of the discharge member hole is formed as a curved surface connected to a side wall of a seating space of the seat body, thereby creating a Coanda effect, due to which air discharged from the discharge member hole flows close to the seat body; and a flow path provided inside the seat body and connecting the air-conditioning device and the discharge members.

2. The independent air-conditioning seat according to claim 1, wherein the seat body comprises a seat cushion configured to support an occupant's lower body and a seat back configured to support an occupant's upper body, which are formed integrally with each other.

3. The independent air-conditioning seat according to claim 1, wherein the flow path is an empty space integrally defined inside the seat body.

4. The independent air-conditioning seat according to claim 1, wherein the flow path has an inlet formed on one side of the rear thereof, and the inlet of the flow path is connected to an outlet of the air-conditioning device by a deformable connection pipe.

5. The independent air-conditioning seat according to claim 2, wherein the discharge members are installed on both sides of the top of the seat back, both sides of the middle of the seat back, and both sides of the seat cushion.

6. The independent air-conditioning seat according to claim 1, wherein the discharge members are inserted and installed into discharge member installation grooves formed on the circumference of the seat body.

7. The independent air-conditioning seat according to claim 6, wherein the discharge members form the circumference of the seat body together with parts between the discharge member installation grooves, and form a continuous surface without steps with the parts between the discharge member installation grooves.

8. The independent air-conditioning seat according to claim 6, wherein the discharge member installation grooves are formed with passage holes communicating with the flow path, and when the discharge members are installed in the discharge member installation grooves, the passage holes of the discharge member installation grooves are connected to the discharge member holes of the discharge members, respectively.

9. The independent air-conditioning seat according to claim 1, wherein each of the discharge members has a guide formed on one side of the upper surface thereof to cover an upper portion of the discharge member hole, the guide being configured to guide a discharge direction of air so that the air having passed through the discharge member hole is discharged toward the inside of the seat body.

10. The independent air-conditioning seat according to claim 1, wherein each of the discharge members is equipped with an adjustment guide to adjust a degree of opening of the discharge member hole and a discharge direction of air.

11. The independent air-conditioning seat according to claim 10, wherein the adjustment guide comprises a pair of elevating rods inserted into insertion holes formed on both sides of the discharge member hole of the discharge member and maintained at its vertical position by friction force with inner surfaces of the insertion holes, and a guide member connected rotatably at both ends thereof via a hinge pin to each of the pair of elevating rods.

12. The independent air-conditioning seat according to claim 11, wherein the guide member has a high central part where the hinge pin is installed, and has an inner end facing the inside of the seat body and an outer end facing the outside of the seat body, which are bent downward compared to the central part.

* * * * *